(12) United States Patent
Schoenborn

(10) Patent No.: US 7,394,863 B2
(45) Date of Patent: Jul. 1, 2008

(54) METHODS AND APPARATUS FOR SIGNALING ON A DIFFERENTIAL LINK

(75) Inventor: Zale T. Schoenborn, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 11/609,072

(22) Filed: Dec. 11, 2006

(65) Prior Publication Data

US 2007/0086531 A1 Apr. 19, 2007

Related U.S. Application Data

(62) Division of application No. 10/097,969, filed on Mar. 14, 2002, now Pat. No. 7,170,949.

(51) Int. Cl.
*H04L 25/34* (2006.01)
*G01N 30/86* (2006.01)

(52) U.S. Cl. .................. 375/286; 375/287; 375/316; 375/318

(58) Field of Classification Search ................. 375/316, 375/286, 287, 318; 327/20, 18, 1
See application file for complete search history.

(56) References Cited

U.S. PATENT DOCUMENTS

| | | |
|---|---|---|
| 5,512,874 A | 4/1996 | Poston |
| 5,523,703 A | 6/1996 | Yamamoto et al. |
| 5,666,068 A | 9/1997 | Ehmann |
| 5,686,872 A | 11/1997 | Fried et al. |
| 5,731,711 A | 3/1998 | Gabara |
| 5,959,472 A | 9/1999 | Nagamatsu et al. |
| 6,034,551 A | 3/2000 | Bridgewater, Jr. |
| 6,085,325 A | 7/2000 | Jackson et al. |
| 6,094,094 A | 7/2000 | Ohtake |
| 6,157,974 A | 12/2000 | Gasparik |
| 6,307,401 B1 | 10/2001 | Bridgewater, Jr. |
| 6,317,839 B1 | 11/2001 | Wells |
| 6,320,406 B1 | 11/2001 | Morgan et al. |
| 6,339,344 B1 | 1/2002 | Sakata et al. |
| 6,411,146 B1 | 6/2002 | Kuo |
| 6,445,730 B1 | 9/2002 | Greszczuk et al. |
| 6,460,143 B1 | 10/2002 | Howard et al. |
| 6,552,578 B1 | 4/2003 | Cheung et al. |

(Continued)

FOREIGN PATENT DOCUMENTS

EP    0788059 A    8/1997

OTHER PUBLICATIONS

Invitation to Pay Additional Fees, including Annex to Form PCT/ISA/206, Communication Relating to the Results of the Partial International Search for PCT/US2003/001531, mailed Dec. 12, 2003 (4 pages).

(Continued)

*Primary Examiner*—Chieh M. Fan
*Assistant Examiner*—Jason M. Perilla
(74) *Attorney, Agent, or Firm*—Hanley, Flight & Zimmerman, LLC

(57) ABSTRACT

Methods and apparatus are disclosed for transitioning a receiver from a first state to a second state using an in-band signal over a differential serial data link.

12 Claims, 5 Drawing Sheets

U.S. PATENT DOCUMENTS

| | | |
|---|---|---|
| 6,593,801 B1 | 7/2003 | Hattori |
| 6,622,178 B1 | 9/2003 | Burke et al. |
| 6,724,891 B1 | 4/2004 | Huang et al. |
| 6,791,371 B1 | 9/2004 | Cheung |
| 2002/0017920 A1 | 2/2002 | Bridgewater, Jr. |
| 2003/0198296 A1 | 10/2003 | Bonelli et al. |

OTHER PUBLICATIONS

International Search Report dated Aug. 3, 2004 for corresponding International Application Serial No. PCT/US2003/001531 and transmittal letter (9 pages).

International Preliminary Examination Report for International Patent Application No. PCT/US2003/001531, mailed Jun. 7, 2004.

METHODS AND APPARATUS FOR SIGNALING ON A DIFFERENTIAL LINK

RELATED APPLICATION

This patent arises from a divisional of U.S. patent application Ser. No. 10/097,969, which was filed on Mar. 14, 2002 and which is hereby incorporated by reference in its entirety.

FIELD OF THE DISCLOSURE

The invention relates generally to differential communication links, and, more particularly, to methods and apparatus for signaling a receiver on a differential link.

BACKGROUND

For the last ten years, the Peripheral Component Interconnect (PCI) standard has been used for connecting peripheral devices (e.g., network cards, modems, graphics cards) to microprocessors in computers and other devices. PCI is a bus technology that transfers synchronized data over several (typically 32-64) parallel channels. PCI and PCI-X (Peripheral Component Interconnect Extended) have throughputs ranging from 133 MBps to 1.1 GBps.

It is widely known that microprocessor speeds have dramatically increased over the years. While the PCI and PCI-X standards are currently sufficient to transfer data between processors and input/output (I/O) devices, if processor speeds continue to increase as expected, the PCI standard will soon become obsolete because increasing the speed of the PCI standard beyond its current limits is prohibitively expensive.

With this in mind, a new I/O architecture has recently been developed. That architecture is currently referred to as the Third Generation Input Output (3GIO) interface standard. Unlike PCI, 3GIO (sometimes referred to as Arapahoe) is a point to point serial communication technology. Rather than including a bus of 32 or 64 channels sending synchronized data, 3GIO uses many fewer channels to transfer data which is not synchronized. (The data transferred in the 3GIO standard includes an embedded clock signal which is used to synchronize the transmitter and the receiver.) The 3GIO architecture is much faster than the PCI and PCI-X standards. It currently permits data transfer at 2.5 Gbit/sec, and is expected to scale upward to the theoretical limits of copper (i.e., 10 Gbit/sec).

The basic link of the 3GIO architecture is a low voltage differentially driven connector pair. If communication is desired in both directions, two low voltage differentially driven connector pairs are used, namely, a transmit pair and a receive pair. The bandwidth between devices can be scaled upward by adding connector pairs to form multiple communication channels. However, the differential link remains the basic communication channel between two devices within the 3GIO architecture.

Known differential serial link protocols prior to 3GIO constantly switched data over the differential links. When a transmitter using these earlier protocols has no actual data to transfer, dummy data is transferred over the link. Transferring dummy data in this manner is particularly desirable in the context of AC coupled and/or AC terminated differential links because the voltage on a quieted line (i.e. one without the dummy data) would drift as the AC coupling and/or AC termination capacitor discharged and subsequently recharged. This voltage could possibly take the line out of the range of the receiver.

Such undesirable drift could also occur over time when actual data is being transmitted. To avoid such undesirable drift when actual data is being transmitted, coding schemes such as 8B10B (i.e. 8 bit/10 bit) are used in differential links employing AC coupling. The dummy codes mentioned above and the 8B10B codes are selected to make sure the DC voltage level on both sides of the AC coupling capacitor stay substantially level (i.e., as many "1" bits as "0" bits are transmitted during each predetermined time period to avoid undesirable charging/discharging of the coupling capacitors).

Because of this concern with voltage drifting, power management techniques are not frequently used with differential serial data links. To the extent power management techniques are used, entry to and exit from the power management state is driven by side band signals. However, these side band techniques are disadvantageous in that they require side band communication lines and involve high latency periods.

DETAILED DESCRIPTION

Although the apparatus and methods disclosed herein are particularly well suited for use with differential serial data links operating in accordance with the 3GIO standard, persons of ordinary skill in the art will readily appreciate that the teachings of the invention are in no way limited to the 3GIO context. On the contrary, persons of ordinary skill in the art will readily appreciate that the teachings of the invention can be employed with any differential serial data link regardless of the communication protocol it employs.

Figure 1:
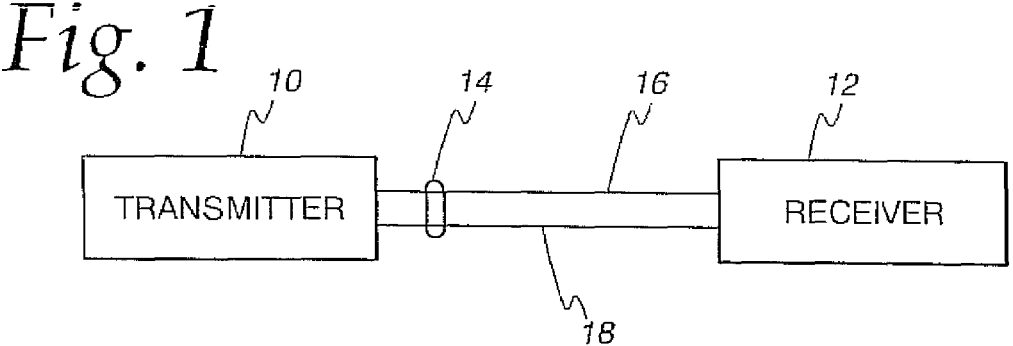
FIG. 1 is a schematic illustration of an example transmitter and receiver connected by a differential serial data link.

A transmitting device 10, a receiving device 12 and a differential serial data link 14 are shown in FIG. 1. For purposes of simplicity of illustration, only one differential pair of lines 16, 18 is shown in the differential link 14 of FIG. 1. However, persons of ordinary skill in the art will appreciate that additional pairs of differential lines may be included if, for example, bi-directional communication and/or additional bandwidth is desired for the link 14.

Figure 2:
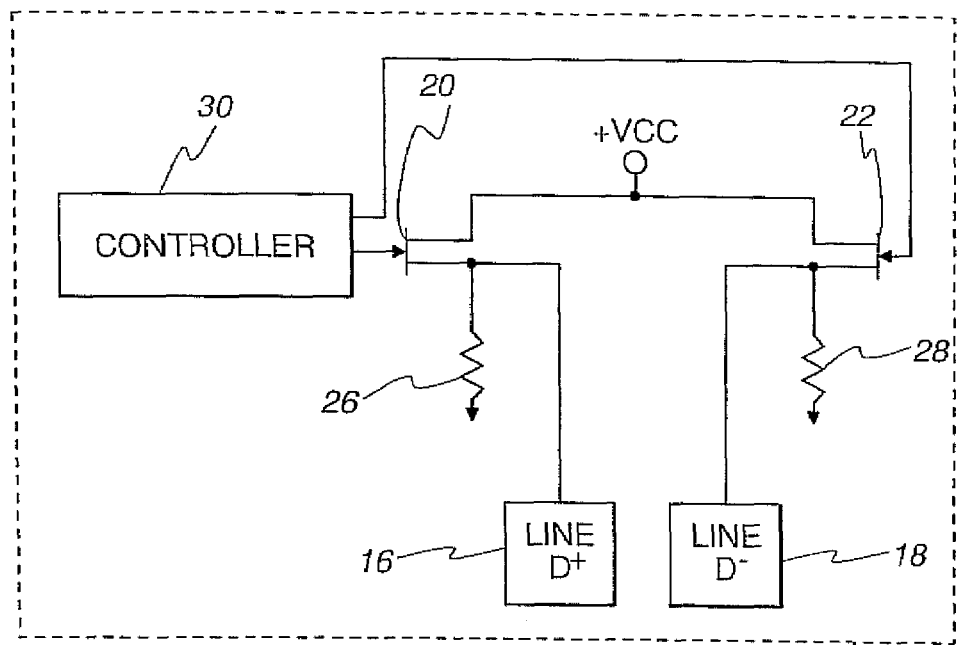
FIG. 2 is a more detailed view of the transmitter of FIG. 1.

The transmitter 10 develops and transmits differential signals over the differential link 14. The transmitter 10 can operate in accordance with any known serial data link protocol, for example, 3GIO, infiniband, Xaui, Sata, etc. and can be constructed in any number of ways. A schematic illustration of one possible implementation of a transmitter 10 is shown in FIG. 2. Although the illustrated transmitter 10 is a current mode driver, persons of ordinary skill in the art will appreciate that a voltage mode driver could likewise be employed in this role.

For the purpose of developing high speed difference signals to be transmitted over the lines 16, 18 of the serial link 14, the transmitter 10 is provided with a pair of transistors 20, 22. The transistors 20, 22 can be implemented by, for example, MOSFETS as shown in FIG. 2 or by any other type of controlled switching device. As shown in FIG. 2, one terminal of each of the transistors 20, 22 is coupled to a power supply. The opposite terminal of each transistor 20, 22 is tied to ground through a driver termination impedance 26, 28. The base of each transistor 20, 22 is in communication with a controller 30. The controller 30 (which may, for example, be implemented by a programmed microprocessor), turns the transistors 20, 22 on and off at opposite times to develop and transmit a difference signal over the lines 16, 18 of the serial link 14.

More specifically, the controller 30 is provided with digital data to be transmitted over the serial link 14. This data is stored in a queue (not shown) associated with the controller 30. At least when the queue contains data for transmission, the controller 30 switches the transistors 20, 22 on and off in accordance with the communication protocol being used to send voltage difference signals representative of the data from the queue over the differential link 14. As shown in FIG. 2, the termination impedances 26, 28, which, in this example, are implemented by resistors, function to bias the lines 16, 18 to a DC voltage level at least when the transmitter 10 is transmitting data via the transistors 20, 22. To transmit a logic value "1," the controller 30 switches one of the transistors 20 on and the other transistor 22 off for a predetermined time period to create a voltage difference on the differential link 14 with line 16 at a higher potential than line 18. To transmit a logic value "0," the controller 30 switches transistor 22 to a conducting state and transistor 20 to a non-conducting state for the predetermined time period to create a voltage difference on the link 14 with line 18 at a higher potential than line 16.

The changes in the relative potentials of the lines 16, 18 are received at the receiver 12. As with the transmitter 10, the receiver 12 can operate in accordance with any known serial data link protocol (e.g., 3GIO, infiniband, Xaui, Sata, etc.), and can be constructed in any number of ways. A schematic illustration of one exemplary implementation of a receiver 12 is shown in FIG. 3.

For the purpose of receiving and interpreting the data signals carried by the serial link 14, the receiver 12 is provided with a difference detector 34. As will be appreciated by persons of ordinary skill in the art, the difference detector 34 can be implemented in many ways. By way of example, not limitation, the difference detector 34 can be implemented by a conventional differential operational amplifier. In this example, the operational amplifier is selected to have high gain.

Figure 3:
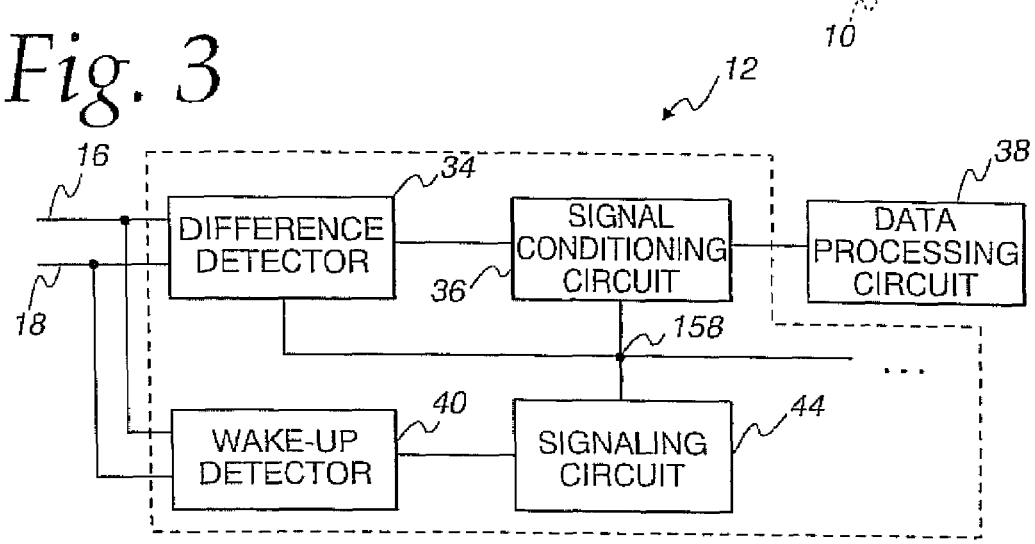
FIG. 3 is a schematic illustration of the receiver of FIG. 1, shown with an example wake-up circuit constructed in accordance with the teachings of the invention.

As shown in FIG. 3, the output of the difference detector 34 is communicated to a conventional signal conditioning circuit 36. Signal conditioning circuit 36 contains various conventional circuitry such as filters, amplifiers and/or level shifters and functions as an analog to digital converter to condition the output of the difference detector 34 into a digital signal to be read by a data processing circuit 38. (Although not part of the receiver 12 in the illustration of FIG. 3, persons of ordinary skill in the art will appreciate that the data processing circuit 38 (which can be a programmed microprocessor or other logic device) may optionally be part of the receiver 12.) The difference detector 34 and the signal conditioning circuit 36 cooperate to provide the data processing circuit 38 with a digital signal representative of logic "1" when the voltage on line 16 exceeds the voltage on line 18 by a predetermined amount, and to provide the data processing circuit 38 with a digital signal representative of logic "0" when the voltage on line 18 exceeds the voltage on line 16 by the predetermined amount.

One or more components of the receiver 12 are adapted to enter a reduced power state when the receiver 12 is not expecting to receive data. As used herein, a reduced power state is a state in which the subject component utilizes reduced or no power. The degree to which power is reduced relative to a normal power state is implementation dependent, and may be for example, as much as a factor of fifty. Various exemplary mechanisms for causing these components to enter the reduced power state are shown in U.S. application Ser. No. 10/097,338. By way of example, the receiver 12 and/or its components can be sent into the reduced power state by quieting the link 14 for a predetermined length of time such that no data is transmitted to the receiver. The receiver can be structured to interpret such quieting as an in-band signal. Of course, other in-band signals and/or out of band signals could alternatively be employed.

For the purpose of waking the receiver 12 from a reduced power state, the receiver 12 is further provided with a wake-up detector 40. The illustrated wake-up detector 40 is responsive to one or more in-band signals received over the differential serial data link 14 to awaken one or more section(s) or component(s) of the receiver 12 from the reduced power state. In the device shown in FIG. 3, the wake-up detector 40 develops an output signal which drives a signaling circuit 44 to signal the component(s) to exit the reduced power state when the in-band signal(s) requesting the same are received over the differential link 14.

While persons of ordinary skill in the art will readily appreciate that any of many different forms of in-band signals can be used to instruct the wake-up detector 40 to awaken the receiver 12 or portions thereof, in the illustrated device the in-band signal is a DC voltage state held substantially constant between the lines 16, 18 of the differential serial data link 14 for at least a predetermined length of time (e.g., a predetermined number of bit cells). When the transmitter 10 determines that transmission of data via the link 14 is desired (this determination may be made, for example, by detecting data in the queue), it will first transmit the in-band wake-up signal to the receiver via link 14. In particular, the transmitter 10 drives one or both of the lines 16, 18 to a predetermined DC voltage state to create a predetermined voltage condition between the lines 16, 18 of the link 14 for at least a predetermined length of time. Persons of ordinary skill in the art will appreciate that the voltage condition can be a difference above a predetermined threshold, a difference below a predetermined threshold, no difference, or a specific difference. In the illustrated example, the voltage condition is a voltage difference. This voltage difference between lines 16, 18 can be achieved by driving and holding one of the lines from an initial voltage level (which may optionally be zero) to a different voltage level for at least a predetermined time period, or by driving both lines simultaneously to different voltage levels (i.e., driving and holding a first one of lines 16, 18 to a first DC voltage level and substantially simultaneously driving and holding the second one of the lines to a second DC voltage level different from the first DC voltage level for at least a predetermined time period). However, the illustrated example drives only one of the lines 16, 18 to the predetermined DC voltage level and holds it there for at least a predefined time period. Alternatively, both lines can be driven to the same or nearly the same voltage and held there for a predetermined time to create the in-band signal (i.e., the in-band signal is a zero voltage difference or small voltage difference for the predetermined time period).

In the illustrated example, when the receiver 12 detects that the DC voltage difference has been held between the lines 16, 18 for at least the predefined time period, the receiver 12 or a portion thereof is transitioned from the reduced power state to the normal power (i.e. wakened) state. Once this transition to the normal power state is complete, the transmitter 10 transmits data to the receiver 12. The transmitter 10 delays after sending the in-band wake-up signal for a sufficient time period to ensure the receiver 12 has appropriately wakened and is ready to receive data.

Alternatively, instead of being a DC signal as described above, the in-band wake-up signal may be implemented by an AC switching signal. For example, when the transmitter 10 determines that transmission of data via the link 14 is desired, it enters the normal power state and begins to alternatively switch the transistors 20, 22 on and off to transmit a plurality of voltage difference signals as the in-band wake-up signal to the receiver via link 14. The voltage difference signals may constitute "dummy data" in the sense that they do not contain any information. Their presence on the lines 16, 18 (i.e., voltage difference between the lines) for at least a predetermined time period constitute an in-band wake-up signal. When the receiver 12 recognizes this in-band signal, the receiver 12 or a portion thereof is transitioned from the reduced power state to the normal power state. Once this transition to the normal power state is complete, the transmitter 10 transmits data to the receiver 12. The transmitter 10 sends the dummy data for a sufficient time period to ensure the receiver 12 has appropriately wakened and is ready to receive data before sending actual data to the receiver.

Figure 4:
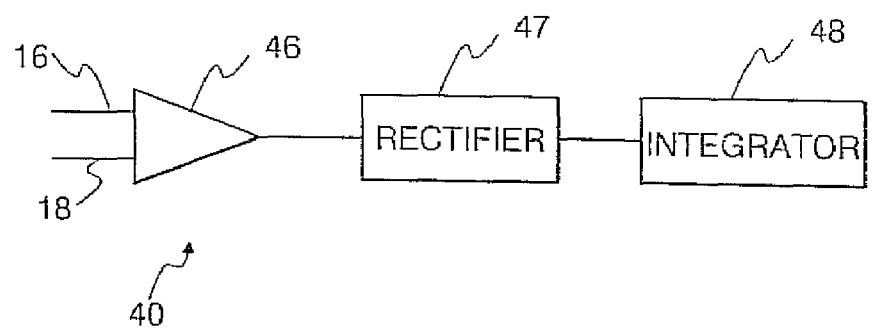
FIG. 4 is a more detailed view of an implementation of the wake-up circuit of FIG. 3.

A more detailed view of an exemplary wake-up detector 40 is shown in FIG. 4. In that illustrated example, the wake-up detector 40 includes a difference detector 46 to detect a voltage difference between the lines 16, 18 of the link 14 and to develop an output signal representative of that difference. The difference detector 46 of the illustrated wake-up circuit 40 is implemented by a differential operational amplifier having low gain so that small changes are not driven to a logic "1" or "−1". As shown in FIG. 4, the illustrated wake-up circuit 40 also includes a rectifier 47 and an integrator 48. The illustrated rectifier 47 has no gain and serves to ensure any non-zero input to the integrator has a positive polarity (i.e., the output of the rectifier 47 is the absolute value of the output of the difference detector 46). The integrator 48 functions as a timer and integrates the output signal of the voltage detector 46 to develop an integrated signal. The integrated signal is compared to a predetermined threshold. When the integrated signal exceeds that threshold, the output of the wake-up circuit (which may optionally be the integrated signal) causes the signaling circuit 44 to signal the receiver 12 or one or more components thereof to waken from the reduced power state as discussed above.

Figure 5:
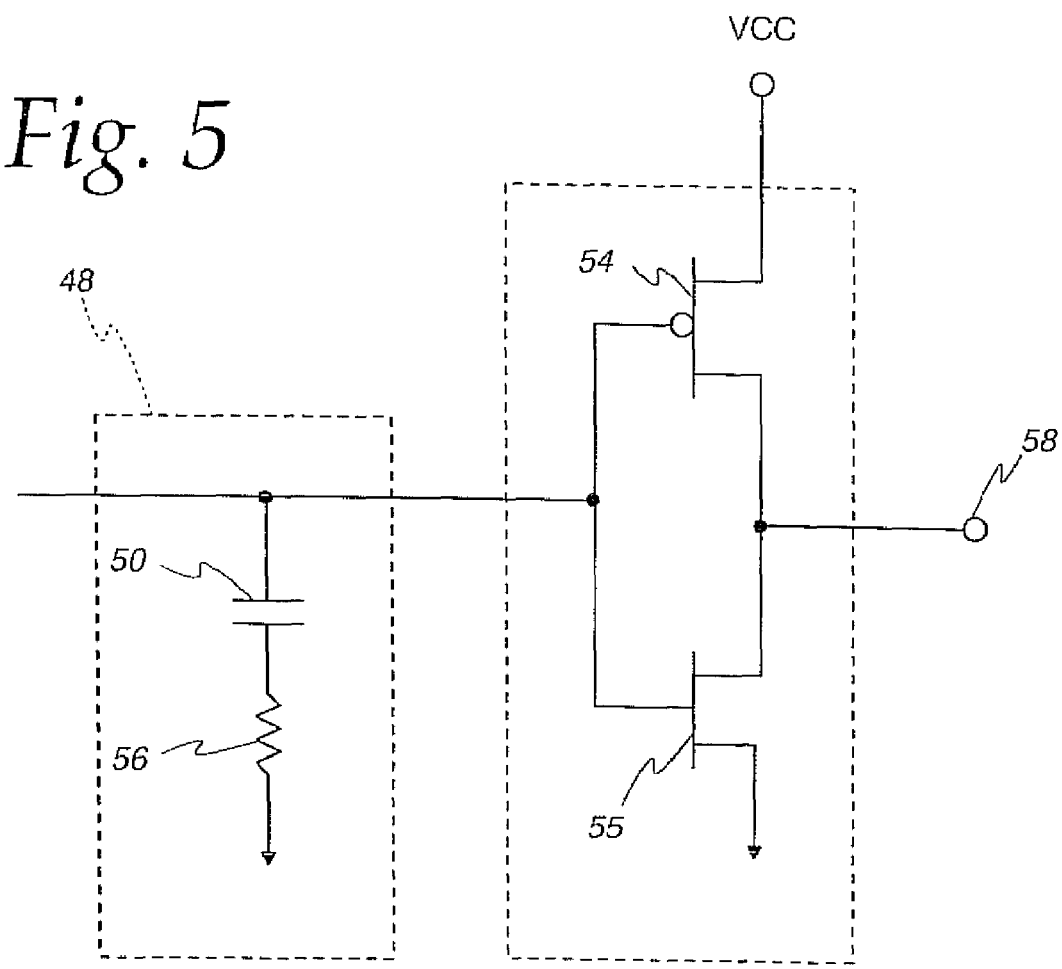
FIG. 5 is a more detailed view of an implementation of the integrator and signaling circuits of FIGS. 3 and 4.

One possible implementation of the integrator 48 is shown in detail in FIG. 5. As shown in that figure, the integrator 48 may optionally be implemented by a capacitor 50 in series with a resistor 56. Thus, in this implementation integration of the output signal of the difference detector 46 is performed by charging the capacitor 50. Preferably, the capacitor 50 is sized such that, if the voltage across the capacitor 50 reaches a predetermined threshold, the voltage difference detected by the detector 46 has been at substantially the appropriate level for at least the predetermined time period and the signaling circuit 44 will, therefore, signal the appropriate components in the reduced power state to enter the normal power state.

One possible implementation of the signaling circuit 44 is shown in FIG. 5. As shown in that figure, the illustrated signaling circuit 44 includes a transistor 54 and a transistor 55. Persons of ordinary skill in the art will appreciate that transistor 54 can be implemented in other ways, but in the illustrated example, it is implemented by a PMOS transistor. Similarly, transistor 55 can be implemented in many ways, but in the illustrated example, it is implemented by an NMOS transistor. As shown in FIG. 5, a first terminal of the transistor 54 is coupled to a power supply. A second terminal of the transistor 54 is coupled to a first terminal of the second transistor 55. The second terminal of the transistor 55 is tied to ground. The gates of the transistors 54, 55 are connected to one another and in communication with the integrator 48. When the integrated signal reaches a sufficient level, the transistor 54 is turned on. On the other hand, when the integrated signal approaches a zero voltage, the transistor 55 is turned on. When transistor 54 is on, transistor 55 is off and vice versa. When the transistor 54 is on, a voltage is developed at the node 58 located between the second terminal of the transistor 54 and the first terminal of the transistor 55. When the transistor 55 is on, the node 58 is connected to ground.

The node 58 between the second terminal of the transistor 54 and the first terminal of the transistor 55 is connected to the section(s) or component(s) of the receiver 12 to signal those section(s) or component(s) to move between the normal power state and the reduced power state as shown in FIG. 3. In particular, when the voltage across the capacitor 50 (i.e., the integrated signal) reaches a sufficient level to switch the transistor 54 into a conducting state, a signal is supplied to the component(s) of the receiver 12 in the reduced power state to arouse them to the normal power state.

Optionally, circuitry may be provided to maintain the transistor 54 in the conducting state until it is desired to switch the receiver 12 and/or components thereof back into the reduced power state (e.g., when no further communication is expected from the transmitter 10). As will be appreciated by persons of ordinary skill in the art, many different circuits can be implementing to maintain the transistor 54 in the conducting state until a command to enter the reduced power state is noted. One possible approach is to employ a controlled switch such as a transistor which connects the base of the transistor 54 to a voltage source after transistor 54 turns on, and which disconnects the voltage source from the base of transistor 54 when a command to switch to the reduced power state is received. Alternatively, if the communication protocol used with the differential serial data link requires continuous switching of data (e.g., actual data and dummy data), the output signal of the difference detector 46 may be sufficient to maintain the voltage across the capacitor 50 at a level sufficient to keep the transistor 54 in the conducting state and the transistor 55 in the off state. Quieting the link 14 and, thus, causing the output of the difference detector 46 to drop to zero would then result in discharging of the capacitor 50 such that the voltage associated with the capacitor 50 would fall below the switch-on threshold of the transistor 54 to thereby turn-off the transistor 54 and turn-on the transistor 55. Turning-off the transistor 54 and turning on the transistor 55 signals at least some portions of the receiver 12 to enter into the reduced power state as explained above.

Figure 6:
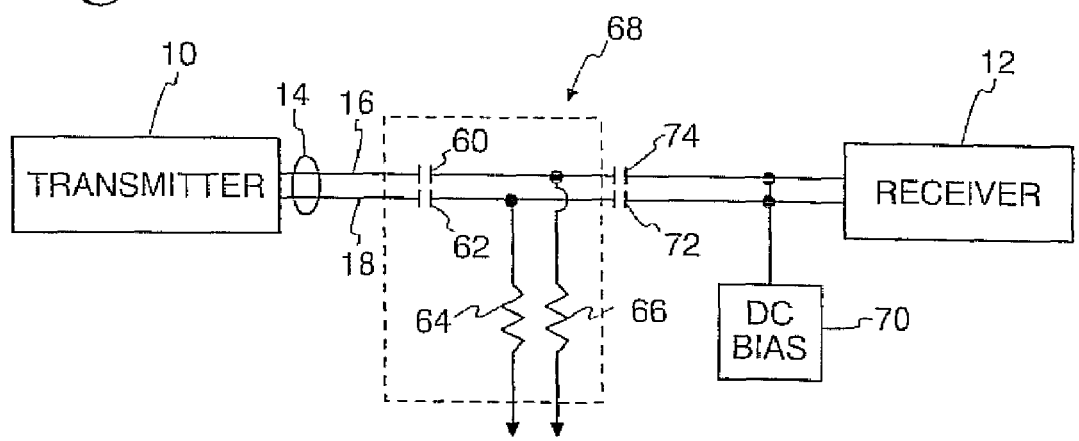
FIG. 6 is a circuit diagram of an AC coupling circuit for the differential link of FIG. 1.

As will be appreciated by persons of ordinary skill in the art, a transmitter 10 and a receiver 12 communicating over a differential serial data link 14 can be DC coupled or AC coupled. AC coupling is often used in circumstances where the transmitter 10 operates at a different DC bias level than the receiver 12 (i.e., the common mode voltages of the transmitter 10 and receiver 12 are different). To maintain this DC voltage difference, AC coupling capacitors 60, 62 are connected in each of the lines 16, 18 of the link 14 as shown in FIG. 6. In this context, the lines 16, 18 may be biased to a first DC voltage level and the in-band wake-up signal or data signals can be generated by driving one or both of the lines 16, 18 to different DC level(s). This in-band signal can optionally cause a shift in the common mode voltage of the receiver 12. Such a shift can optionally be the wake-up signal to the receiver 12.

DC coupling, on the other hand, can be used in circumstances where no DC bias difference is present between the transmitter 10 and the receiver 12. In the DC coupling context, the AC coupling capacitors 60, 62 are omitted.

Persons of ordinary skill in the art will readily appreciate that shunt impedances 64, 66 are frequently used to impedance match the transmission lines 14, 16 to the receiver 12. Impedance matching is performed to avoid signal reflections as is well known. When only resistive impedances are employed as shown in FIG. 6, the transmission lines 14, 16 are said to be DC terminated. When a capacitor is coupled between the resistors 64, 66 adjacent ground, the lines 14, 16 are said to be AC terminated.

Figure 7:
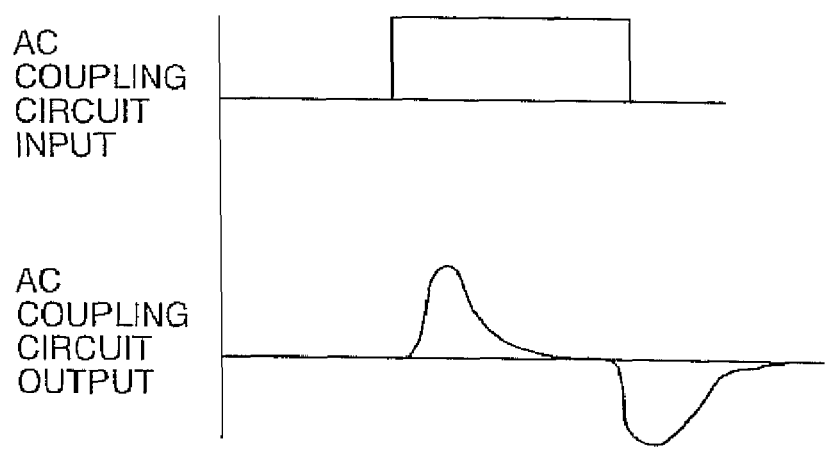
FIG. 7 is a diagram showing an in-band wake-up signal input to an AC coupling circuit, and an output of the AC coupling circuit in response to that wake-up signal.

FIG. 6 illustrates an exemplary AC coupling circuit 68 which includes AC coupling capacitors 60, 62 and resistive shunt impedances 64, 66. Since capacitors 60, 62 function as an open circuit to a DC signal, and since the illustrated in-band wake-up signal is a DC difference signal of at least a predetermined duration and a predetermined magnitude (i.e., the data rate is slower than the RC time constant of the AC coupling circuit 68) the AC coupling capacitors 60, 62 will not pass the entire DC signal. Instead, as shown in FIG. 7, while the transmitter output (i.e., the input signal to the AC coupling circuit 68) on, for example, line 16 appears as a square wave, the output from the AC coupling circuit 68 appears as a decaying pulse. The time rate of decay of the pulse is dependent on the RC constant of the AC coupling circuit (e.g., the dimensions of AC coupling capacitor 60 and shunt resistance 66). As a result, in the context of AC coupling, the in-band wake-up signal reaching the receiver 12 and, thus, the difference detector 46 will have significantly less energy than the in-band wake-up signal generated by the transmitter 10 if the rate of switching is lower than the RC time constant. Accordingly, to ensure that the integrated signal exceeds the threshold required to wake-up the receiver 12 or portions thereof, the AC coupling capacitors 60, 62, the shunt resistances 64, 66, and the capacitor 50 and resistor 56 of the integrator 48 must be properly dimensioned. While many different dimensioning arrangements can be selected, one possible example is to size the coupling capacitors 60, 62 at 1600 picofarads (pf), the shunt resistances 64, 66 at 50 ohms, the capacitor 50 of the integrator 48 at 1 pf, and the resistor 56 of the integrate 48 at 1000 ohms. In addition, in this context, the in-band signal must change fast enough to make the impedance of the AC coupling capacitors 50, 62 appear small. In other words, a slowly rising signal would not be the best choice for the wake-up signal because of the blocking effect of the AC coupling capacitors.

Because some receivers 12 may not be designed to receive signals that swing around zero volts, it is sometimes desirable to DC bias the input of the receiver 12 to a predetermined voltage. FIG. 6 shows one possible approach to achieving this end. In particular, a DC voltage source 70 is connected to lines 16, 18 to bias these lines to a desired level. Blocking capacitors 72, 74 are used as shown in FIG. 6 to maintain a DC separation between the DC biased input to the receiver 12 and the output of the AC coupling circuit 68. When the blocking capacitors 72, 74 are used, they should be dimensioned to be at least ten times larger than the capacitor 50 of the integrator 48. A DC bias 70 may also be used to maintain the input of the sleeping or idle receiver 12 at a constant DC level when the receiver is in the reduced power state.

In an AC coupled system, when the transmitter 10 and receiver 12 are in their reduced power states, it is possible to permit the AC coupling capacitors 60, 62 to discharge. This is not, however, desirable if low latency is a requirement of the system. In other words, if it is desirable to wake-up the receiver 12 quickly to start communicating data, the AC coupling capacitors 60, 62 should not be permitted to discharge since communication should not begin until those capacitors 60, 62 have reached their charged state. Moreover, permitting the AC coupling capacitors to drift between charged and uncharged states during the reduced power, and/or transition (i.e., the state between the reduced power state and the normal power (i.e., wakened) state) states could cause the voltage across them to move outside the operating range of the receiver 12.

Figure 8:
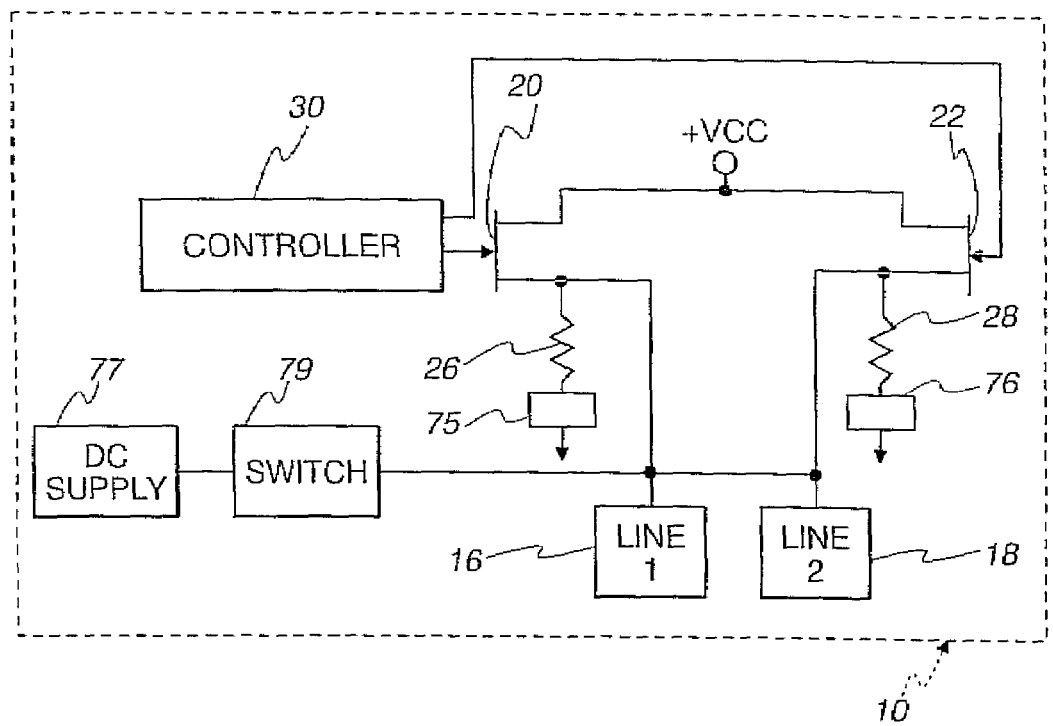
FIG. 8 is a schematic illustration of an alternative transmitter.

To avoid the delay associated with recharging the capacitors 60, 62 after a period of no communication and to avoid possible errors caused by permitting voltage drifting outside the operating range of the receiver 12, the transmitter 10 can optionally be modified as shown in FIG. 8. In particular, the transmitter 10 can be provided with switches 75, 76 connected in series with the termination resistors 26, 28 and a power supply 77 can be selectively coupled to the lines 16, 18 via a switch 79 for biasing the lines 16, 18 to a desired DC voltage. Thus, when the transmitter 10 enters a reduced power state, the switches 75, 76 are closed to remove the termination resistors 26, 28 from the circuit, and the ends of the lines 16, 18 are coupled to the power supply 77 via switch 79. As a result, the lines 16, 18 are not permitted to drift, but are instead maintained at the DC bias level of supply 77. Consequently, the AC coupling capacitors 60, 62 do not discharge. When a wake-up event is desired, lines 16, 18 are immediately made ready for communication by simply closing the switches 75, 76 to reconnect the termination resistors 26, 28 to their respective lines 16, 18, and by disconnecting the power supply 77 from the lines 16, 18 via switch 79. The power supply 77 can optionally remain connected to the lines 16, 18 at all times, but such an approach will utilize more power than selectively coupling and uncoupling that power supply 77 as discussed above.

It is possible to use the number of in-band wake-up signals received by the receiver 12 to convey information. For example, if desired, the disclosed methods and apparatus can be modified to sequentially wake-up different sections of the receiver 12 in response to sequential in-band signals. A modified receiver having two different sections 76, 78 which can be separately wakened is shown in FIG. 9.

Figure 9:
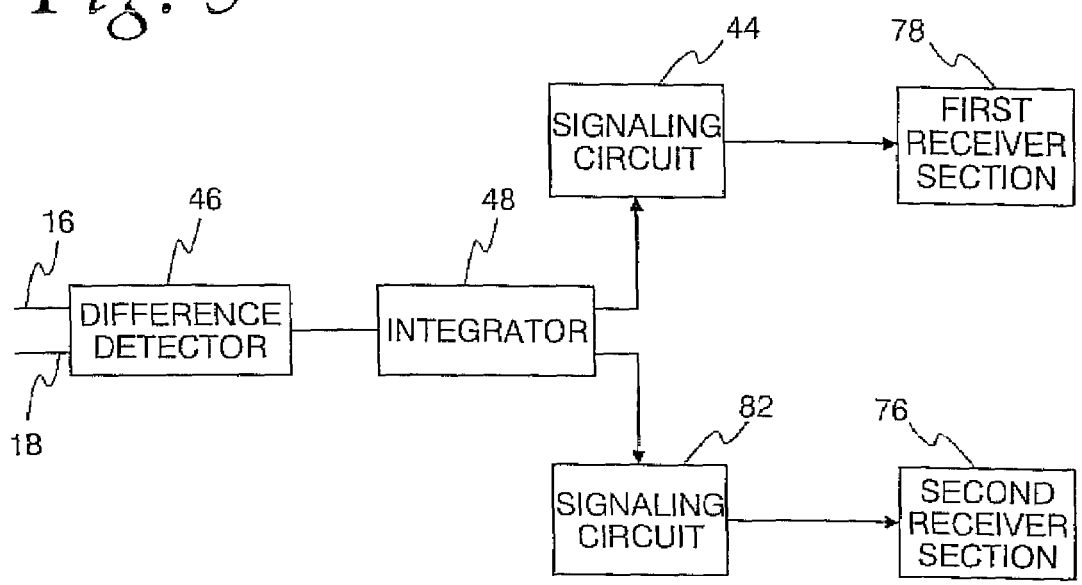
FIG. 9 is a schematic diagram of another receiving device constructed in accordance with the teachings of the invention.

As shown in FIG. 9, the modified receiver includes a difference detector 46, an integrator 48 and a signaling circuit 44 as described above. As shown in FIG. 9, the signaling circuit 44 functions to selectively signal at least a first section 78 of the receiver to enter or exit the reduced power state. In the modified receiver, a second switching circuit 82 operates to selectively signal at least a second section 76 of the receiver to enter or exit the reduced power state. While, in this example, the first signaling circuit 44 signals its respective receiver section(s) 78 to exit the reduced power state in response to a first in-band wake-up signal as explained above, in this example the second signaling circuit 82 has a higher threshold than the first signaling circuit 44 such that it will not signal its respective receiver section(s) 76 to exit the reduced power state in response to the first in-band wake-up signal. Instead, the second signaling circuit 82 will only waken its respective receiver section(s) 76 if a second in-band wake-up signal received from the transmitter 10 via the link 14 causes the integrated signal output by the integrator 48 to reach a second level which is higher than the first level. Various known circuits can be used to make the second signaling circuit 82 non-responsive to the first in-band signal including, for example, level shifting circuits that cut the input to the gate of the PMOS and NMOS transistors of the second signaling circuit 82 (similar to the transistors 54, 55 of the signaling circuit 44) in half for a two in-band signal wake-up methodology.

The first and second in-band wake-up signals may be identical. Alternatively, the in-band wake-up signals may have differences in, for example, duration and/or magnitude. Although, for simplicity, only two in-band wake-up signals and two receiver sections 76, 78 have been discussed, persons of ordinary skill in the art will appreciate that any number of in-band wake-up signals can be used to awaken any number of receiver sections without departing from the scope or spirit of the invention.

Figure 10:
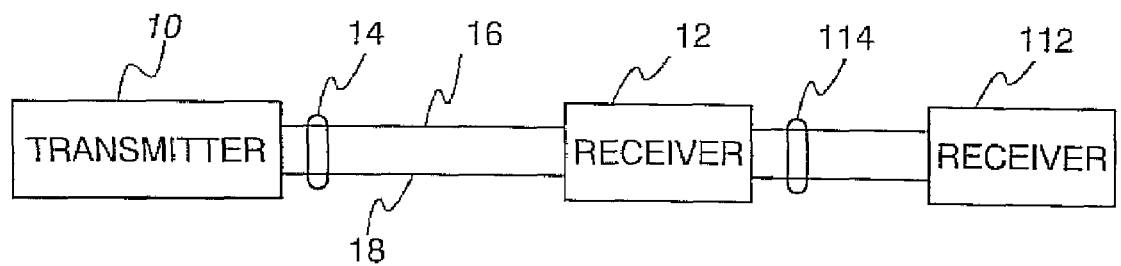
FIG. 10 is a schematic illustration similar to FIG. 1 but showing a second receiver and a second differential serial data link.

Although much of the above discussion has focused on waking a receiver 12 from a reduced power state to a wakened state, persons of ordinary skill in the art will appreciate that the in-band signaling techniques disclosed herein can be used to transition the receiver 12 between any two desired states. By way of examples, not limitation, the in-band signaling technique can be used to transition the receiver 12 from a reduced power state to a reset state, or to transition the receiver from a reduced power state to a reduced power state wherein the in-band signal received by the receiver 12 is relayed over a second differential serial data link 114 to a second receiver 112 as shown in FIG. 10.

From the forgoing, persons of ordinary skill in the art will appreciate that methods and apparatus have been provided for employing one or more in-band signal(s) to awaken a receiver from a reduced power state via a differential serial data link. Advantageously, the use of in-band signal(s) to waken the receiver avoids the use of side band signals and side-band connections, which translates into lower cost and higher bandwidth per signals needed. The disclosed methods are not clock-based and can be used with any differential link communication protocol.

Although certain apparatus constructed in accordance with the teachings of the invention have been described herein, the scope of coverage of this patent is not limited thereto. On the contrary, this patent covers all embodiments of the teachings of the invention fairly falling within the scope of the appended claims either literally or under the doctrine of equivalents.

What is claimed is:

1. For use with a transmitter, a receiver and a differential serial data link connecting the transmitter and receiver, a method comprising:
    transmitting an in-band signal to the receiver via the differential serial data link; and
    transitioning at least a first portion of the receiver from a first state to a second state in response to the in-band signal, wherein the in-band signal is a voltage state on the differential serial data link, wherein the transmitter and receiver are AC coupled and the in-band signal is a change in a DC common mode voltage of the differential serial data link at the receiver for at least a predetermined time period.

2. A method as defined in claim 1 wherein the first state is a reduced power state and the second state is a normal power state.

3. A method as defined in claim 1 wherein the first state is a reduced power state and the second state is a reset state.

4. A method as defined in claim 1 wherein the first state is a normal power state and the second state is a reset state.

5. A method as defined in claim 1 wherein the first state is a normal power state and the second state is a a reduced power state.

6. A method as defined in claim 1 wherein the transitioning of the at least the first portion of the receiver is performed if a first one of at least two lines in the differential serial data link maintains a first DC voltage level and the second one of the at least two lines maintains a second DC voltage level for at least a predefined time period.

7. A method as defined in claim 1 wherein the transitioning of the at least the first portion of the receiver is performed if first and second ones of at least two lines in the differential serial data link both maintain a first DC voltage level for at least a predefined time period.

8. A method as defined in claim 1 wherein the transitioning of the at least the first portion of the receiver is performed by:
    developing a signal representative of the change in the DC common mode voltage;
    integrating the developed signal to develop an integrated signal; and
    signaling the at least the first portion of the receiver to enter the second state if the integrated signal exceeds a threshold.

9. A method as defined in claim 8 wherein the integrating of the developed signal further comprises charging an RC circuit; and the signaling of the at least the first portion of the receiver is performed if a voltage associated with the RC circuit exceeds the threshold.

10. A method as defined in claim 9 further comprising transitioning the at least the first portion of the receiver from the second state to the first state when no further communication is expected from the transmitter.

11. A method as defined in claim 10 wherein the transitioning of the at least the first portion of the receiver from the second state to the first state is performed by:
    discharging the RC circuit; and
    if the voltage associated with the RC circuit falls below the threshold, signaling the at least the first portion of the receiver to enter the second state.

12. A method as defined in claim 1 wherein transmitting the first in-band signal comprises driving a first one of at least two lines of the differential serial data link to a first DC voltage level.

* * * * *